(12) United States Patent
Shiga et al.

(10) Patent No.: US 6,452,745 B1
(45) Date of Patent: *Sep. 17, 2002

(54) MAGNETIC TAPE CARTRIDGE

(75) Inventors: Hideaki Shiga, Kanagawa-ken (JP); Kiyoo Morita, Kanagawa-ken (JP); Jeffrey S. McAllister, Boise, ID (US); Thomas R. Albrecht, San Jose, CA (US); Robert Ralph Heinze, San Clemente, CA (US)

(73) Assignee: Fuji Photo Film Co. Ltd., Mineamiashigara (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,484

(22) Filed: Dec. 16, 1998

(30) Foreign Application Priority Data

Dec. 18, 1997 (JP) .............................................. 9-348923
Mar. 12, 1998 (JP) ........................................... 10-060973

(51) Int. Cl.⁷ .............................................. G11B 23/08
(52) U.S. Cl. ....................................................... 360/132
(58) Field of Search ................................. 360/132, 242; 242/348, 348.1, 348.2, 348.3, 348.4

(56) References Cited

U.S. PATENT DOCUMENTS 5,610,789 A    3/1997 Miller ......................... 360/132

FOREIGN PATENT DOCUMENTS

| DE | 42 14 446 S | 11/1993 |
| EP | 0 537 714 A2 | 4/1993 |
| EP | 0 677 845 A | 10/1995 |
| WO | WO 93 21633 | 10/1993 |
| WO | WO 95 06944 A | 3/1995 |
| WO | WO 97 45837 A | 12/1997 |

*Primary Examiner*—Robert S. Tupper
(74) *Attorney, Agent, or Firm*—Sughrue Mion, PLLC

(57) ABSTRACT

A magnetic tape cartridge includes a cartridge casing formed by upper and lower casing halves mated together and a single reel around which a magnetic tape is wound and which is supported for rotation in the cartridge casing by the upper casing half. A memory holding structure holds a non-contact type memory element with its recording surface held substantially at 45° to the bottom surface of the cartridge casing.

25 Claims, 20 Drawing Sheets

MAGNETIC TAPE CARTRIDGE

BACKGROUND OF THE INVENTION

1. Field of the Invention

This invention relates to a magnetic tape cartridge, and more particularly to a magnetic tape cartridge comprising a cartridge casing and a single reel around which a magnetic tape is wound and which is contained in the cartridge casing for rotation.

2. Description of the Related Art

There has been known a single reel magnetic tape cartridge, comprising a cartridge casing and a single reel around which a magnetic tape is wound and which is contained in the cartridge casing for rotation, as a recording medium for an external storage for a computer and the like. Such a single reel magnetic tape cartridge is used for retaining important data of a computer or the like and accordingly is arranged so that trouble such as tape jamming does not occur and the magnetic tape is not accidentally drawn out.

Further since various data are recorded on the magnetic tape, the magnetic tape cartridge is provided with a memory element so that the contents of the data recorded on the magnetic tape and the kind of the magnetic tape can be known without reading out the data from the tape. Such information on the contents of the magnetic tape is recorded on the memory element by a non-contact system such as electromagnetic induction and the information is read out from the memory element by a non-contact system.

The memory element is provided on the surface of the magnetic tape cartridge or inside the cartridge casing where the memory element does not interfere with rotation of the reel. It is required that the recording surface of the memory element is set at an angle required by the recording and reproducing system as the external storage or the like.

Further there has been known a single reel magnetic tape cartridge provided with a slide door for opening and closing a tape outlet opening, the slide door being urged toward the closing position by a spring. In such a single reel magnetic tape cartridge, there has been a problem that when the magnetic tape cartridge is loaded in the recording and reproducing system and the slide door is opened overcoming the force of the spring, counterforce of the urging force of the spring acts on the cartridge casing and rotates the magnetic tape cartridge in the recording and reproducing system. When the magnetic tape cartridge is rotated in the recording and reproducing system, the ejection mechanism of the recording and reproducing system cannot properly grip the magnetic tape cartridge and a corner portion of the magnetic tape cartridge can abut against the inner wall of the system when the magnetic tape cartridge is ejected from the recording and reproducing system, which can obstruct ejection of the magnetic tape cartridge.

SUMMARY OF THE INVENTION

In view of the foregoing observations and description, the primary object of the present invention is to provide a single reel magnetic tape cartridge on which the memory element can be mounted with its recording surface held at 45° relative to the bottom surface of the cartridge casing as required by a recording and reproducing system.

Another object of the present invention is to provide a single reel magnetic tape cartridge in which the magnetic tape cartridge is prevented from being rotated in a recording and reproducing system.

The magnetic tape cartridge in accordance with a first aspect of the present invention comprises a cartridge casing formed by upper and lower casing halves mated together and a single reel around which a magnetic tape is wound and which is supported for rotation in the cartridge casing by the upper casing half, and is characterized by having a memory holder means which holds a non-contact type memory element with its recording surface held substantially at 45° to the bottom surface of the cartridge casing.

It is preferred that the non-contact type memory element be square in shape in view of facility of mounting.

For example, the memory holder means may comprise a lower end face abutment portion which abuts against the lower end face of the memory element and an upper end face abutment portion which abuts against the upper end face of the memory element.

The terms "the lower end face of the memory element" and "the upper end face of the memory element" as used herein respectively mean the end face on the side of the lower casing half and the end face on the side of the upper casing half. The expression "abuts against the end face of the memory element" means that the abutment portion abuts against the end face of the memory element and/or a portion of the upper or lower surface of the memory element near the end face.

For example, the lower end face abutment portion may be a recess which is formed in the lower casing half and snugly receives the lower end face of the memory element and the upper end face abutment portion may be a recess which is formed in the lower casing half at a portion where the lower casing half is butted against the upper casing half and snugly receives the upper end face of the memory element.

The memory holder means also may comprise a lower end face abutment portion which abuts against the lower end face of the memory element, an upper end face abutment portion which abuts against the upper end face of the memory element and an upper surface abutment portion which abuts against the upper surface of the memory element.

It is preferred that the lower and upper end face abutment portions abut against at least one of the side faces in addition to the respective end faces.

Further the memory holder means may comprise a lower side face abutment portion which snugly receives a part of the side faces of the memory element from below and an upper side face abutment portion which snugly receives a part of the side faces of the memory element from above.

Each of the upper end face abutment portion, the upper surface abutment portion and the upper and lower side face abutment portion may double as a reinforcement rib for reinforcing the upper or lower casing half.

It is preferred that the memory holder means be formed of a cushioning material and holds the memory element away from the inner surface of the cartridge casing. Otherwise a cushioning material may be disposed between the memory element and the memory holder means.

The cushioning material may be any material so long as it can cushion impact on the memory element, for instance, when the magnetic tape cartridge is dropped onto the floor. For example, elastic porous resin such as urethane foam, joint filler for tiling and the like may be employed.

Further it is preferred that the lower casing half be provided with a guide member which guides the memory element dropped toward the guide member to the position where the memory element is held by the memory holder means. The guide member may be, for instance, an inclined guide plate on which the memory element is slid to the position where the memory element is held by the memory holder means.

Since the non-contact type memory element is held substantially at 45° to the bottom surface of the cartridge casing by the memory holder means, the magnetic tape cartridge of the first aspect of the present invention can satisfy requirement by a recording and reproducing system which requires that the recording surface of the memory element is at 45° to the bottom surface of the cartridge casing.

Though the memory holder means may be of various structures, when the lower end face abutment portion is in the form of a recess which snugly receives the lower end face of the memory element, the memory element can be prevented from moving sideways and at the same time, positioning of the memory element upon incorporation of the memory element in the cartridge casing is facilitated.

Further when the upper end face abutment portion is in the form of a recess which is formed in the lower casing half at a portion where the lower casing half is butted against the upper casing half and snugly receives the upper end face of the memory element, the memory element can be held without forming an additional member, which simplifies the structure of the cartridge casing and facilitates manufacture of the cartridge casing.

Further when the memory holder means comprises an upper surface abutment portion which is formed on the upper casing half of the cartridge casing and abuts against the upper surface of the memory element in addition to the lower end face abutment portion which abuts against the lower end face of the memory element and the upper end face abutment portion which abuts against the upper end face of the memory element, the memory element can be surely held at 45° to the bottom surface of the cartridge casing.

Further when the lower and upper end face abutment portions abut against at least one of the side faces in addition to the respective end faces, the memory element can be prevented from moving sideways and at the same time, positioning of the memory element upon incorporation of the memory element in the cartridge casing is facilitated.

Further when the upper end face abutment portion, the upper surface abutment portion and the upper and lower side face abutment portion double as reinforcement ribs for reinforcing the upper or lower casing half, the number of the components for holding the memory element can be reduced, which simplifies the structure of the cartridge casing and facilitates manufacture of the cartridge casing.

Further when the memory holder means is formed of a cushioning material and holds the memory element away from the inner surface of the cartridge casing, the memory element can be protected from impact applied to the cartridge casing from outside and prevented from being damaged by vibration of the casing or when the magnetic tape cartridge is dropped.

Further when the lower casing half is provided with a guide member which guides the memory element dropped toward the guide member to the position where the memory element is held by the memory holder means, the memory element can be held by the memory holder means at 45° to the bottom surface of the cartridge casing by simply dropping the memory element with the casing held substantially horizontal, whereby positioning of the memory element upon incorporation of the memory element in the cartridge casing is facilitated.

Further the memory holder means may comprise a through hole formed in a non-recording area of the memory element and a post-like projection which is formed in the cartridge casing and is fitted in the through hole to hold the memory element with its recording surface inclined at 45° to the bottom surface of the cartridge casing.

For example, the through hole is formed so that at least a part of the inner peripheral surface of the through hole is inclined at about 45° to the recording surface of the memory element and the post-like projection is formed so that at least a part of its outer surface extends vertical to the bottom surface of the cartridge casing, and the post-like projection is fitted into the through hole so that the inclined part of the inner peripheral surface of the through hole is brought into contact with the vertical part of the outer surface of the post-like projection.

When the diameter of the post-like projection is such that the post-like projection is press-fitted in the through hole, the memory element can be firmly held by the post-like projection.

Further the post-like projection may be provided with a support shoulder which is brought into contact with the surface of the memory element to hold the memory element at 45° to the bottom surface of the cartridge casing. Also at this time, it is preferred that the diameter of the post-like projection be such that the post-like projection is press-fitted in the through hole so that the memory element can be firmly held by the post-like projection.

In accordance with a second aspect of the present invention, there is provided a magnetic tape cartridge to be loaded in a recording and reproducing system comprising a cartridge casing which is substantially rectangular in shape, a single reel around which a magnetic tape is wound and which is supported for rotation in the cartridge casing and a door which opens and closes a tape outlet opening which is formed in a side wall of the cartridge casing and through which the magnetic tape is drawn out of the cartridge casing, the door being movable along the side wall between an opening position and a closing position and urged toward the closing position by an urging means, wherein the improvement comprises that an engagement recess is formed in a side wall of the cartridge casing to be brought into engagement with a stopper member in the recording and reproducing system when the magnetic tape cartridge is loaded therein, thereby preventing the magnetic tape cartridge from being rotated under turning moment which is generated by counterforce against the force of the urging means when the door is moved to the opening position overcoming the force of the urging means.

It is preferred that the engagement recess conforms to the stopper member in shape and is arranged to be applied from the stopper member with load which cancels said turning moment.

Further it is preferred that the engagement recess be provided with a surface which is faced upward and receives force directed toward the bottom surface of the cartridge casing when the engagement recess is engaged with the stopper member.

DESCRIPTION OF THE PREFERRED EMBODIMENT

Figure 1:
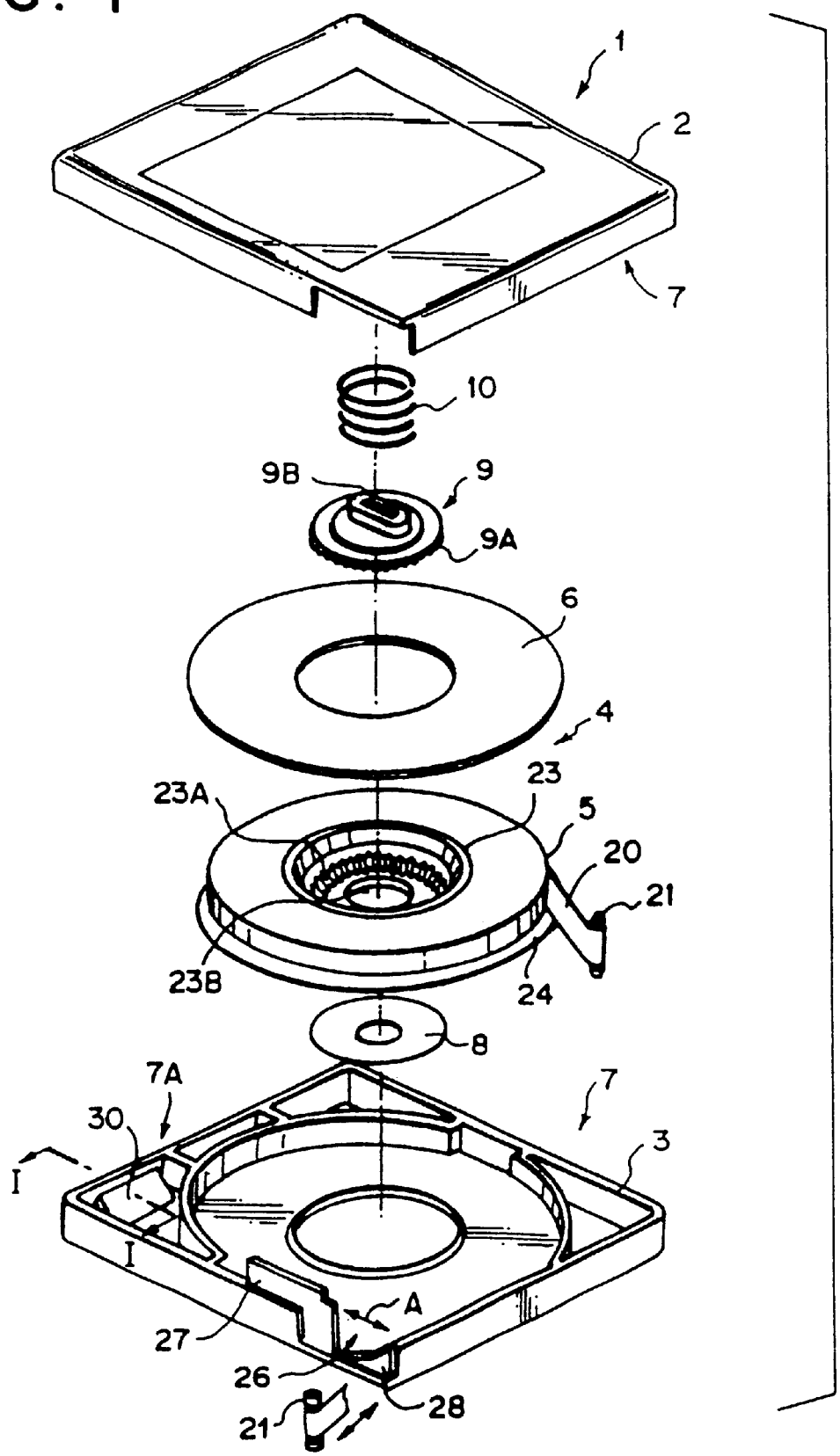
FIG. 1 is an exploded perspective of a magnetic tape cartridge in accordance with an embodiment of the present invention.

In FIG. 1, a magnetic tape cartridge 1 in accordance with an embodiment of the present invention comprises a single reel 4 around which a magnetic tape 20 is wound and is contained for rotation in a cartridge casing 7. The reel 4 is formed by bonding together a lower reel half 5 and an upper reel half 6 by ultrasonic welding. The cartridge casing 7 is formed by fastening together upper and lower casing halves 2 and 3 by screws and the like.

The lower reel half 5 comprises a cylindrical hub 23 and a flange 24 which are integrally molded from synthetic resin. A reel plate 8 for magnetically connecting a drive mechanism of a recording and reproducing system is mounted on the outer bottom surface of the hub 23. Further on the inner bottom surface of the hub 23, is formed a stopper gear 23A which is brought into engagement with a brake gear 9A formed on a brake button 9 and prevents rotation of the reel 4 when the magnetic tape cartridge 1 is not used. The hub 23 is provided with an opening 23B, through which a brake release spindle in the recording and reproducing system is inserted to push upward the brake button 9. The brake button 9 is provided with said brake gear 9A at the lower end thereof and with a groove 9B at the upper end thereof. The groove 9B receives a guide projection (not shown). The brake button 9 is urged downward by a coiled spring 10 and is normally received in the hub 23, where the brake gear 9A and the stopper gear 23A are in mesh with each other to prevent rotation of the reel 4. When the magnetic tape cartridge 1 is loaded in the recording and reproducing system, the brake release spindle of the recording and reproducing system pushes upward the brake button 9, whereby the gears 9A and 23A are disengaged from each other to permit rotation of the reel 4.

A tape outlet opening 26 through which the magnetic tape 20 is drawn out is formed in a side wall of the cartridge casing 7. The tape outlet opening 26 is closed and opened by a slide door 27 which is slidable in the directions of double-headed arrow A and is urged in the closing position by a spring not shown.

A leader pin 21 is fixed to the leading end of the magnetic tape 20 and when the magnetic tape cartridge 1 is not used, the magnetic tape 20 is entirely wound around the reel 4 with the leader pin 21 held in a recess 28 formed near the tape outlet opening 26.

When the magnetic tape cartridge 1 is loaded in a recording reproducing system, the gears 23A and 9A of the hub 23 and the brake button 9 are disengaged from each other to permit rotation of the reel 4 in the manner described above and the drive mechanism of the recording and reproducing system holds the reel plate 8 under magnetic force and rotates the reel 4. At the same time, the slide door 27 is opened and the leader pin 21 is brought to a predetermined position in a tape running path, thereby recording or reproduction becomes feasible.

Figure 2:
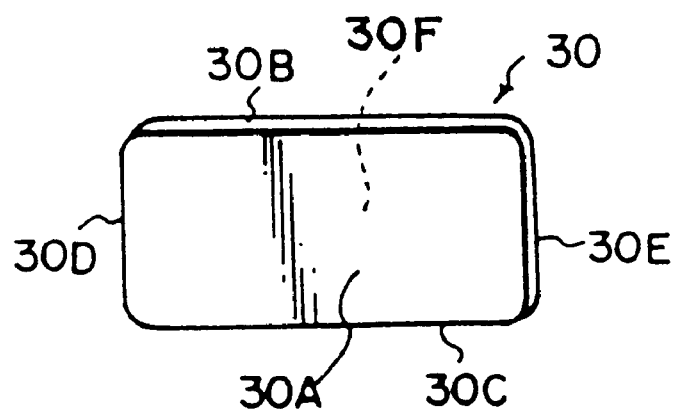
FIG. 2 is a perspective view of the memory in cartridge.

A non-contact type memory element (memory in cartridge) 30 (will be abbreviated as "MIC", hereinbelow) for recording the contents of the information recorded on the magnetic tape and the like is provided in a corner 7A of the cartridge casing 7. The MIC 30 is like a rectangular plate as shown in FIG. 2 in this particular embodiment, and information is recorded on and read out from the MIC 30 by a non-contact system such as electromagnetic induction. As shown in FIG. 2, the MIC 30 has a recording surface 30A on which the information is recorded, upper and lower end faces 30B and 30C and left and right side faces 30D and 30E. The MIC 30 is mounted in the corner 7A of the cartridge casing 7 with the recording surface 30A held at 45° to the bottom surface of the cartridge casing 7. In this particular embodiment, the MIC 30 is held with the recording surface 30A faced upward. Accordingly, the recording surface 30A is referred to as "the upper surface 30A" and the surface 30F opposite to the recording surface 30A will be referred to as "the lower surface 30F", hereinbelow.

Various memory holding structures for holding the MIC 30 in the cartridge casing 7 will be described hereinbelow.

Figure 3:
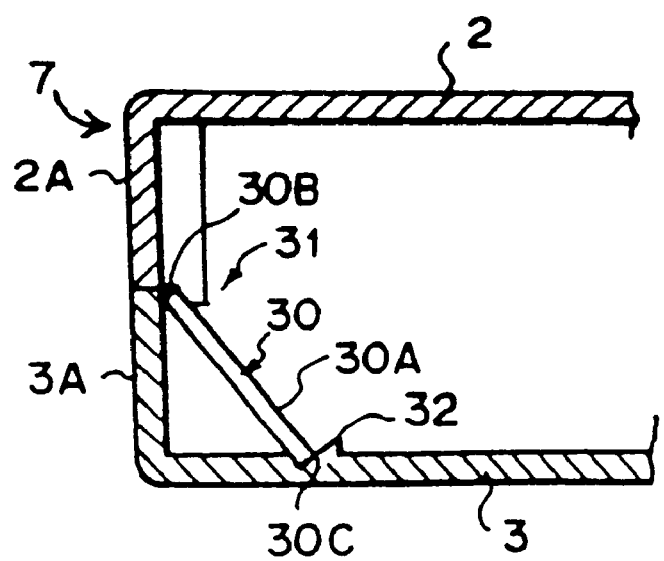
FIG. 3 is a view showing a first example of the memory holder means.

FIG. 3 is a cross-sectional view taken along line I—I in FIG. 1 in the assembled state of the magnetic tape cartridge 1 and shows a memory holding structure of a first example. As shown in FIG. 3, the memory holding structure of the first example comprises a lower end face abutment portion 32 which is formed in the lower casing half 3 and abuts against the lower end face 30C of the MIC 30 and an upper end face abutment portion 31 which is formed in the upper casing half 2 and abuts against the upper end face 30B of the MIC 30.

Figure 4A:
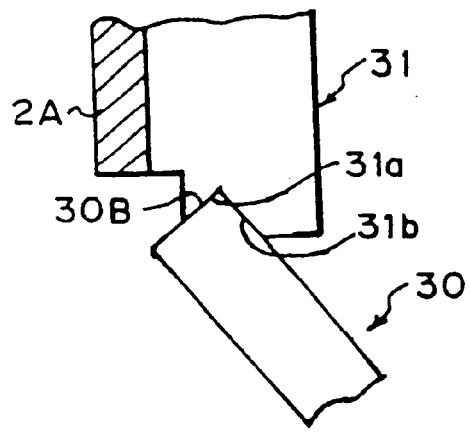
FIG. 4A is a fragmentary cross-sectional view showing the upper end face abutment portion of the memory holder means.
Figure 4B:
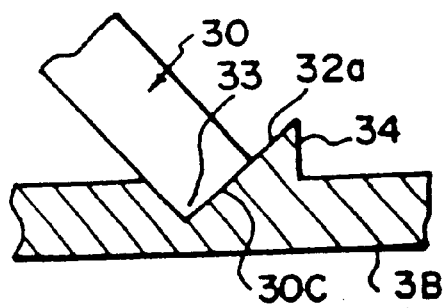
FIG. 4B is a fragmentary cross-sectional view showing the lower end face abutment portion of the memory holder means.
Figure 4C:
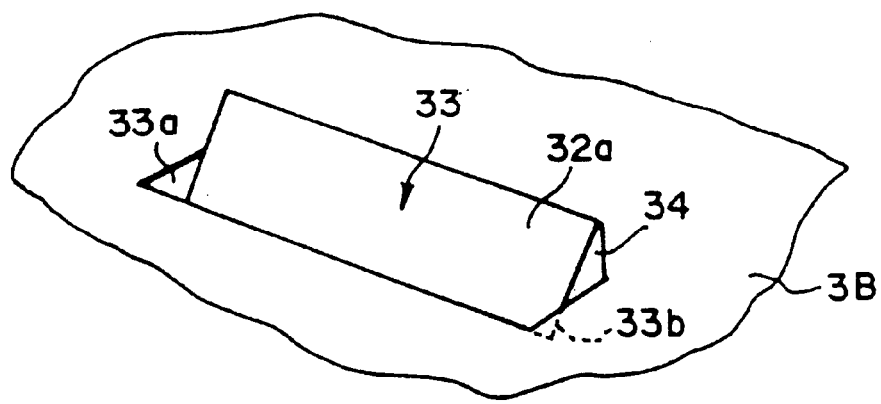
FIG. 4C is a fragmentary perspective view showing the lower end face abutment portion of the memory holder means.

As shown in FIGS. 4B and 4C, the lower end face abutment portion 32 is formed on the bottom surface 3B of the lower casing half 3 and comprises a recess 33 which extends in parallel to a side wall 3A of the lower casing half 3 in a length substantially equal to the length of the major side of the MIC 30 and a protrusion 34 which projects inward from the recess 33. The recess 33 is a right triangle in cross-section and has end faces 33a and 33b. One inclined surface of the recess 33 smoothly merges with a surface of the protrusion 34 and forms a flat surface 32a which is at substantially 45° to the bottom surface of the lower casing half 2. The surface 32a supports the lower end face 30C of the MIC 30 and the end faces 33a and 33b of the recess 33 hold the side faces 30D and 30E of the MIC 30. The other inclined surface of the recess 33 supports the lower surface of the MIC 30.

As shown in FIG. 4A, the upper end face abutment portion 31 is formed on a lower end portion of a block which extends inward from a side wall 2A of the upper casing half 2 and comprises a recess which is a right triangle in cross-section and is formed in the lower surface of the block. The recess comprises opposed inclined surfaces 31a and 31b which are in contact respectively with the upper end face 30B of the MIC 30 and the upper surface 30A of the MIC 30 near the upper end face 30B.

With this structure, the MIC 30 is held in the cartridge casing 7 with the upper surface 30A held at 45° to the bottom surface 3B of the casing 7. Further since the end faces 33a and 33b are in contact with the side faces 30D and 30E of the MIC 30, the MIC 30 cannot move in the direction parallel to the side wall 3A, whereby positioning of the MIC 30 during incorporation of the MIC 30 in the cartridge casing 7 is facilitated.

Figure 5A:
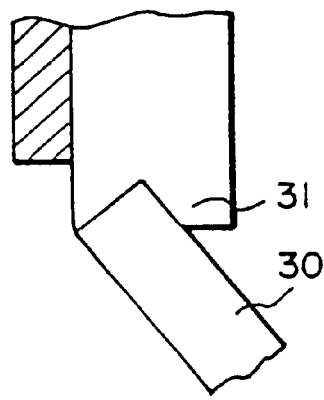
FIG. 5A is a fragmentary cross-sectional view showing the upper end face abutment portion of a memory holder means in accordance with a modification of the first example.
Figure 5B:
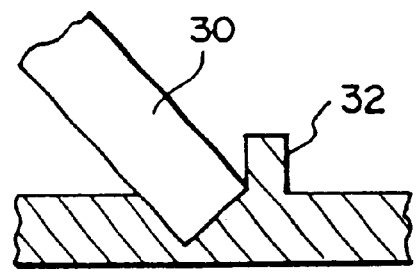
FIG. 5B is a fragmentary cross-sectional view showing the lower end face abutment portion of the memory holder means in accordance with the modification of the first example.
Figure 6:
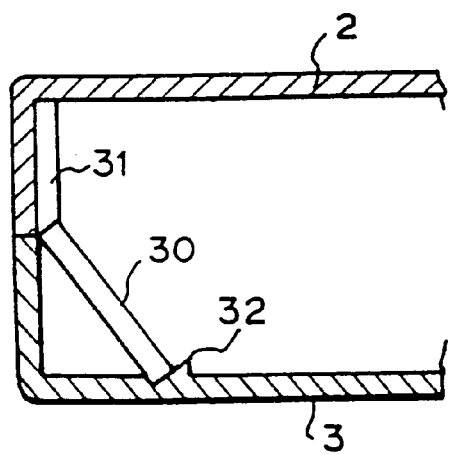
FIG. 6 is a view similar to FIG. 3 but showing a memory holder means in accordance with another modification of the first example.

The upper end face abutment portion 31 and the lower end face abutment portion 32 of the memory holding structure of the first example may be variously modified and for example may be as shown in FIGS. 5A and 5B, respectively. Further the upper end face abutment portion 31 may comprise a single inclined surface which is parallel to the inclined surface 32a (FIG. 4C) as shown in FIG. 6. In the modification shown in FIG. 6, since neither the upper end face abutment portion 31 nor the lower end face abutment portion 32 covers the upper surface 30A of the MIC 30, the MIC 30 can be provided with a semiconductor layer (recording area) over the entire area of the upper surface 30A.

Figure 7:
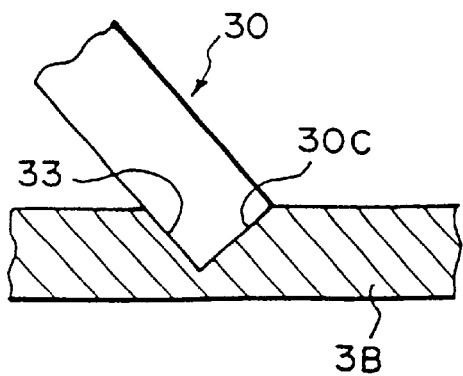
FIG. 7 is a fragmentary cross-sectional view showing the lower end face abutment portion of a memory holder means in accordance with still another modification of the first example.

Further the lower end face abutment portion 32 may comprise only a recess 33 which extends in parallel to a side wall 3A of the lower casing half 3 in a length substantially equal to the length of the major side of the MIC 30 as shown in FIG. 7.

In the first example, the upper end face abutment portion 31 can function also as a rib for reinforcing the upper casing half 2, whereby the structure of the cartridge casing is simplified and manufacture of the cartridge casing is facilitated.

Figure 8:
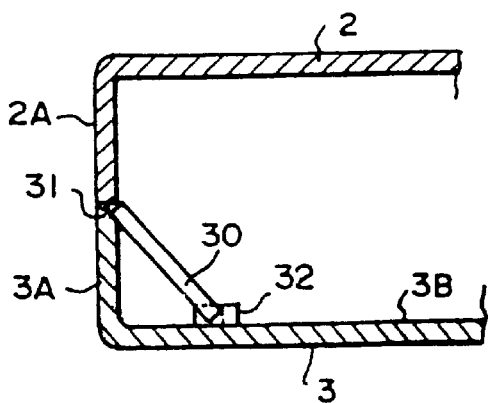
FIG. 8 is a view similar to FIG. 3 but showing a memory holder means of a second example.

A second example of the memory holding structure will be described hereinbelow. FIG. 8 is a view similar to FIG. 3 but showing a second example of the memory holding structure. In FIG. 8, the memory holding structure of the second example comprises a lower end face abutment portion 32 which is formed on the bottom of the lower casing half 3 and holds the lower end face 30C of the MIC 30 and an upper end face abutment portion 31 in the form of a recess which is formed in the lower casing half 3 at a portion where the lower casing half 3 is butted against the upper casing half 2 and abuts against the upper end face 30B of the MIC 30.

Figure 9:
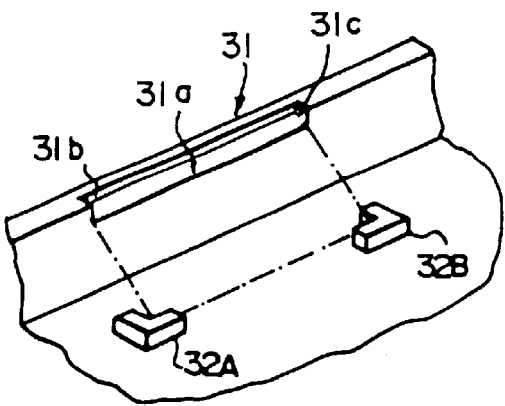
FIG. 9 is a fragmentary perspective view showing in detail the memory holder means of the second example.

As shown in FIG. 9, the lower end face abutment portion 32 comprises a pair of L-shaped members 32A and 32B. The L-shaped member 32A is engaged with a part of the side face 30D and a part of the lower end face 30C of the MIC 30 and the L-shaped member 32B is engaged with a part of the side face 30E and a part of the lower end face 30C of the MIC 30. The upper end face abutment portion 31 in the form of the recess formed in the lower casing half 3 at a portion where the lower casing half 3 is butted against the upper casing half 2 extends along the side wall 3A in a length slight longer than the length of the MIC 30 and has a surface 31a in contact with the lower surface 30F of the MIC 30 near the upper end face 30B thereof and a pair of end faces 31b and 31c in contact respectively with the side faces 30D and 30E near the upper end face 30B thereof.

With this structure, the MIC 30 is held in the cartridge casing 7 with the upper surface 30A held at 45° to the bottom surface 3B of the casing 7. Further since the side faces 30D and 30E of the MIC 30 are held by the end faces 31b and 31c of the upper end face abutment portion 31 and the lower end face abutment portion 32, the MIC 30 cannot move in the direction parallel to the side wall 3A, whereby positioning of the MIC 30 during incorporation of the MIC 30 in the cartridge casing 7 is facilitated. Further since it is not necessary to form an additional member for holding the upper end face 30B of the MIC 30, the structure of the cartridge casing 7 is simplified and manufacture of the cartridge casing 7 is facilitated.

Figure 10:
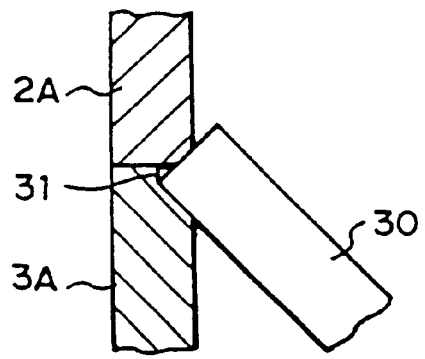
FIG. 10 is a fragmentary cross-sectional view showing the upper end face abutment portion of a memory holder means in accordance with a modification of the second example.

Though, in the second example, the lower end face abutment portion 32 comprises a pair of L-shaped members 32A and 32B, the lower end face abutment portion 32 may comprise only one of the L-shaped members 32A and 32B. Further though, in the second example, the recess which forms the upper end face abutment portion 31 is entirely formed in the lower casing half 3, the recess may be formed partly in the lower casing half 3 and partly in the upper casing half 2 as shown in FIG. 10.

Figure 11:
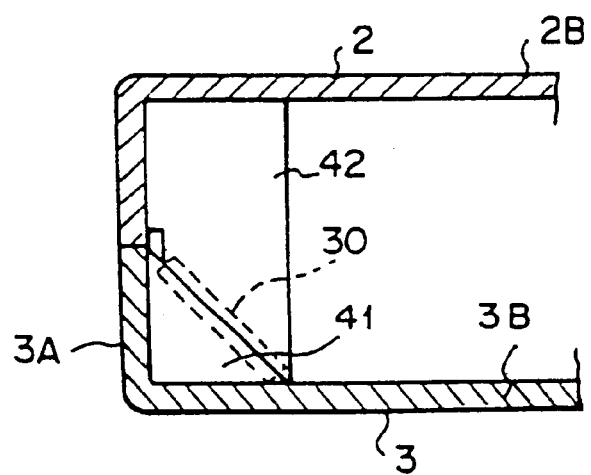
FIG. 11 is a view similar to FIG. 3 but showing a memory holder means of a third example.

A third example of the memory holding structure will be described hereinbelow. FIG. 11 is a view similar to FIG. 3 but showing a third example of the memory holding structure. In FIG. 11, the memory holding structure of the third example comprises a lower side face abutment portion 41 which is formed in the lower casing half 3 and snugly receives a part of the side faces 30D and 30E of the memory element 30 from below and an upper side face abutment portion 42 which is formed in the upper casing half 2 and snugly receives a part of the side faces 30D and 30E of the memory element 30 from above.

Figure 12A:
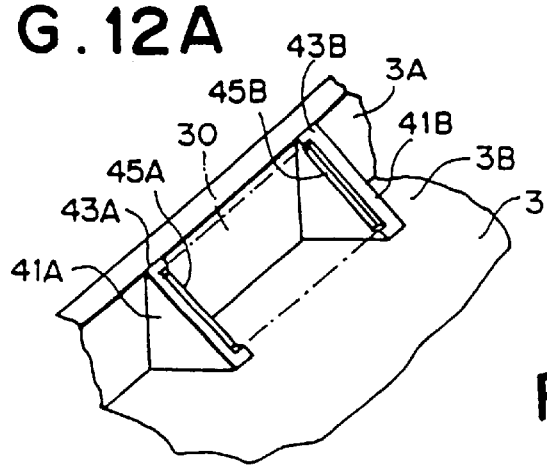
FIG. 12A is a fragmentary perspective view showing the lower side face abutment portion of the memory holder means.

As shown in FIG. 12A, the lower side face abutment portion 41 is formed in a corner between the side wall 3A and the bottom surface 3B of the lower casing half 3 and comprises a pair of support members 41A and 41B respectively having support surfaces 43A and 43B which are inclined at 45° to the bottom surface 3B of the lower casing half 3. The support surfaces 43A and 43B are respectively provided with recesses 45A and 45B which snugly receive the side faces 30D and 30E of the MIC 30 from below.

Figure 12C:
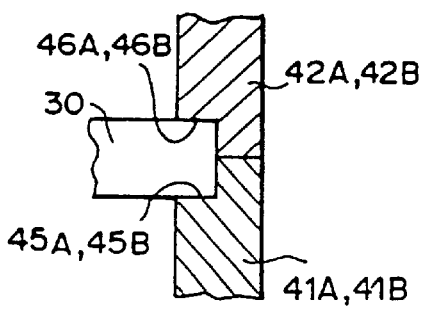
FIG. 12C is fragmentary cross-sectional view showing an important part of the memory holder means.
Figure 12B:
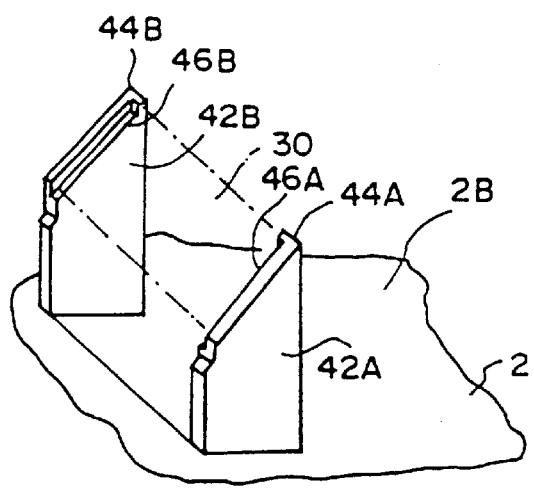
FIG. 12B is a fragmentary perspective view showing the upper side face abutment portion of the memory holder means.

As shown in FIG. 12B, the upper side face abutment portion 42 is formed in a corner between the side wall 2A (omitted in FIG. 12B) and the top surface 2B of the upper casing half 2 and comprises a pair of support members 42A and 42B respectively having support surfaces 44A and 44B which are inclined at 45° to the top surface 2B of the upper casing half 2. The support surfaces 44A and 44B are respectively provided with recesses 46A and 46B which snugly receive the side faces 30D and 30E of the MIC 30 from above.

In the assembled state of the magnetic tape cartridge, each side face of the MIC 30 is snugly received partly in the recess 45A (45B) of the lower side face abutment portion 41 and partly in the recess 46A (46B) of the upper side face abutment portion 42 as shown in FIG. 12C.

Figure 13A:
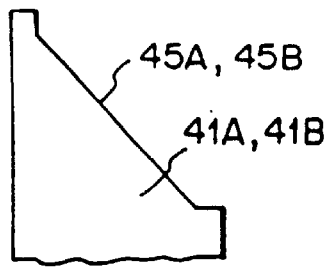
FIGS. 13A and 13B are fragmentary views each for illustrating a preferred shape of the lower side face abutment portion.
Figure 13B:
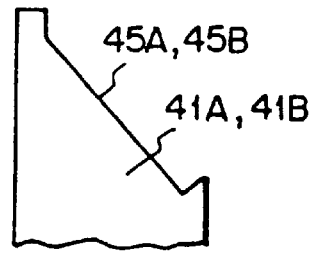

It is preferred that the recesses 45A and 45B of the lower side face abutment portion 41 be of a shape such as those shown in FIGS. 13A and 13B which permits the lower casing half 3 to be easily ejected from a mold when molding the lower casing half 3. Similarly it is preferred that the recesses 46A and 46B of the upper side face abutment portion 42 be of a shape such which permits the upper casing half 2 to be easily ejected from a mold when molding the upper casing half.

With this structure, the MIC 30 is held in the cartridge casing 7 with the upper surface 30A held at 45° to the bottom surface 3B of the casing 7. Further since the side faces 30D and 30E of the MIC 30 are snugly received in the recesses 45A, 45B, 46A and 46B, the MIC 30 cannot move in the direction parallel to the side wall 3A, whereby positioning of the MIC 30 during incorporation of the MIC 30 in the cartridge casing 7 is facilitated. Further since the upper and lower side face abutment portions 42 and 41 can function as ribs for reinforcing the upper and lower casing halves 2 and 3 and it is not necessary to form additional members for holding the MIC 30, the structure of the cartridge casing 7 is simplified and manufacture of the cartridge casing 7 is facilitated.

In the third example, the upper side face abutment portion 42 need not be provided with recesses 46A and 46B when the recesses 45A and 45B of the lower side face abutment portion 41 are substantially the same in depth as the thickness of the MIC 30.

Figure 14:
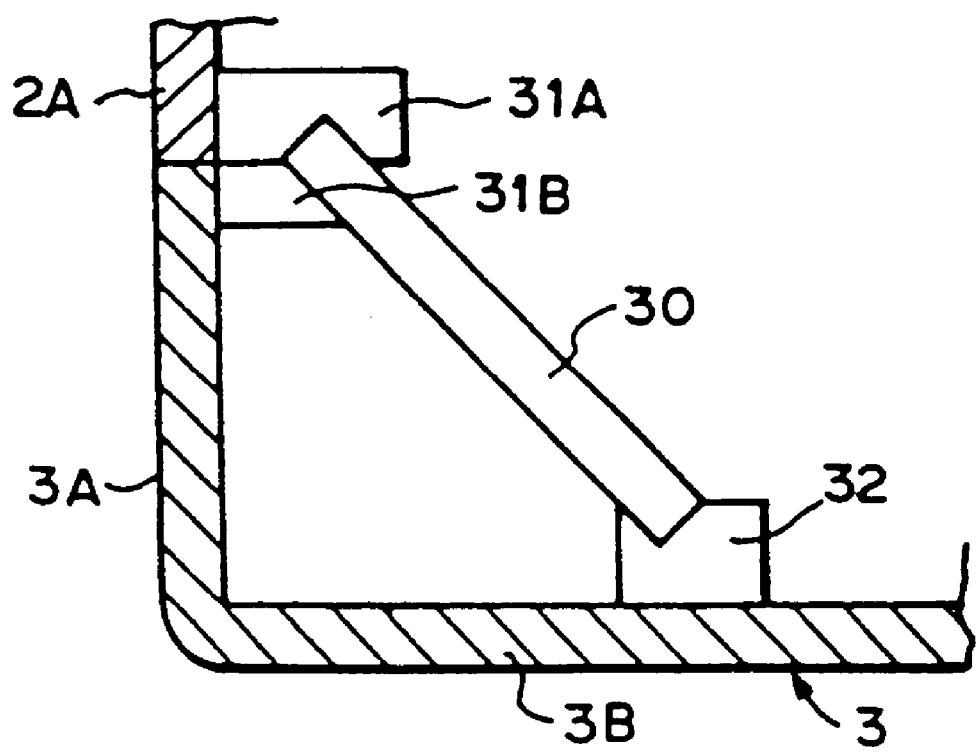
FIG. 14 is a fragmentary cross-sectional view showing a memory holder means of a fourth example.

A fourth example of the memory holding structure will be described hereinbelow. In FIG. 14, the memory holding structure of the fourth example comprises a lower end face abutment portion 32 which is formed in the lower casing half 3 and abuts against the lower end face 30C of the MIC 30 and an upper end face abutment portion 31 which is formed in the upper casing half 2 and abuts against the upper end face 30B of the MIC 30. Both the upper and lower end face abutment portions 31 and 32 are formed of cushioning material.

As shown in FIG. 14, the lower end face abutment portion 32 is in the form a block which is of cushioning material and extends inward from the bottom surface 3B of the lower casing half 3. The block is provided with a recess which extends in parallel to the side wall 3A of the lower casing half 3 in a length substantially equal to the length of the major side of the MIC 30. The recess receives the lower end face 30C of the MIC 30 and a portion of the lower surface 30F near the lower end face 30C, whereby the lower end face abutment portion 32 holds the MIC 30 away from the bottom of the cartridge casing 7.

The upper end face abutment portion 31 is formed on blocks 31A and 31B which are of cushioning material and extend inward respectively from the side wall 2A of the upper casing half 2 and the side wall 3A of the lower casing half 3A. The block 31A is provided with a recess which receives the upper end face 30B of the MIC 30 and a portion of the upper surface 30A near the upper end face 30B, and the block 31B has an inclined surface which abuts against the lower surface 30F of the MIC 30 at a portion near the upper end face 30B, whereby the upper end face abutment portion 31 holds the MIC 30 away from the side walls 2A and 3A of the cartridge casing 7.

With this structure, the MIC 30 is held in the cartridge casing 7 with the upper surface 30A held at 45° to the bottom surface 3B of the casing 7. Further since the upper and lower end face abutment portions 31 and 32 are both formed of a cushioning material and holds the MIC 30 away from the inner surface of the cartridge casing 7, the MIC 30 can be protected from impact applied to the cartridge casing 7 from outside and prevented from being damaged by vibration of the casing 7 or when the magnetic tape cartridge 1 is dropped. Stopper members which abut against the side faces 30D and 30E of the MIC 30 may be provided in order to prevent the MIC 30 from moving sideways when the memory holding structure does not abut against the side faces 30D and 30E as in the fourth example.

Figure 15A:
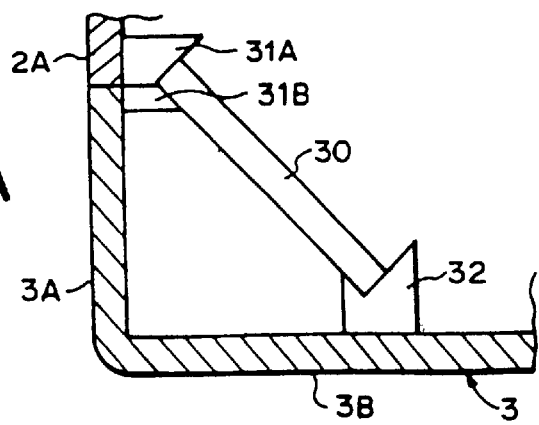
FIGS. 15A to 15D are views respectively showing modifications of the fourth example.
Figure 15B:
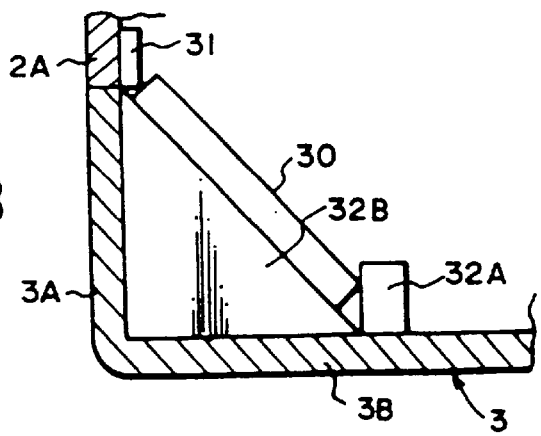
Figure 15C:
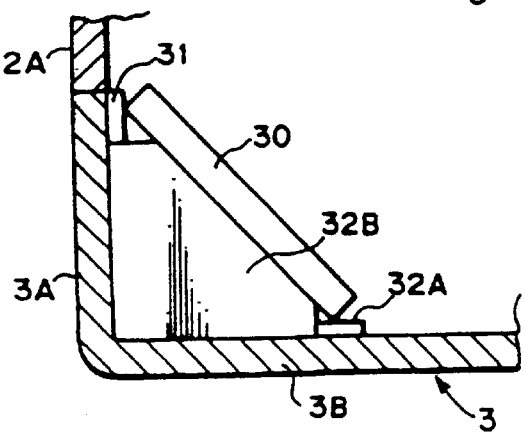
Figure 15D:
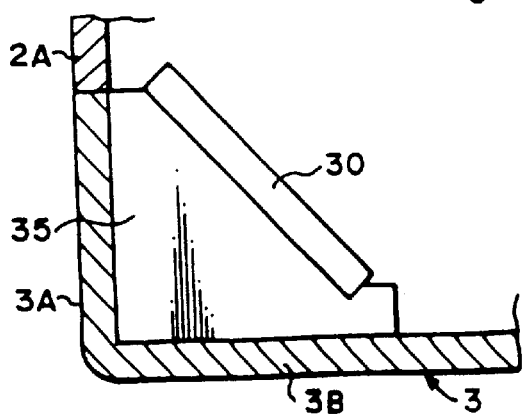

The upper end face abutment portion 31 and the lower end face abutment portion 32 of the memory holding structure of the fourth example may be variously modified and for example may be as shown in FIG. 15A. Further as shown in FIGS. 15B and 15C, a block 32B which abuts against the entire area of the lower surface 30C of the MIC 30 may be provided. Further the upper and lower end face abutment portions may be integrated into a holding member 35 as shown in FIG. 15D.

Figure 16:
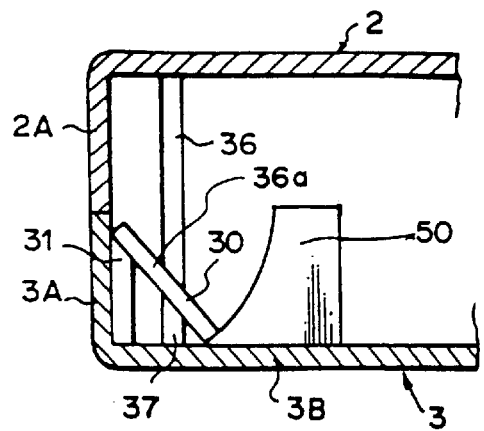
FIG. 16 is a view similar to FIG. 3 but showing a memory holder means of a fifth example.

A fifth example of the memory holding structure will be described hereinbelow. FIG. 16 is a view similar to FIG. 3 but showing a fifth example of the memory holding structure. In FIG. 16, the memory holding structure of the fifth example comprises an upper end face abutment portion 31 which is formed in the lower casing half 3 and abuts against the upper end face 30B of the MIC 30, an upper surface abutment portion 36 which is formed in the upper casing half 2 and abuts against the upper surface 30A of the MIC 30 and a lower surface abutment portion 37 which is formed in the lower casing half 3 and abuts against the lower surface 30F of the MIC 30. The lower casing half 3 is further provided with a guide plate 50 which guides the lower end face 30C of the MIC 30.

Figure 17:
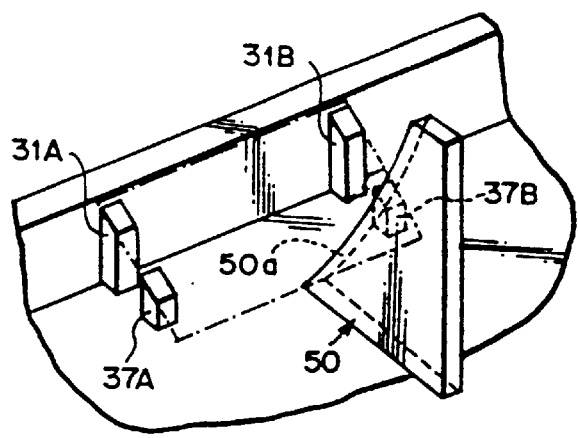
FIG. 17 is a fragmentary perspective view showing in detail the memory holder means of the fifth example.

As shown in FIG. 17, the upper end face abutment portion 31 comprises a pair of support posts 31A and 31B each of which is projected inward from the side wall 3A of the lower casing half 3 and is provided with an inclined surface which supports the lower surface 3OF of the MIC 30 at a portion near the upper end face 30B. The lower surface abutment portion 37 comprises a pair of support posts 37A and 37B each of which extends upward from the bottom of the lower casing half 3 and is provided with an inclined surface which supports the lower surface 30F of the MIC 30 from below. As shown in FIG. 16, the upper surface abutment portion 36 extends downward from the top surface 2B of the upper casing half 2 is provided with an inclined surface 36a which abuts against the upper surface 30A of the MIC 30 from above. As shown in FIG. 17, the guide plate 50 extends upward from the bottom of the lower casing half 3 substantially at the middle between the support posts 37A and 37B and is provided with an arcuate surface 50a which guides the MIC 30 dropped toward the abutment portions 31 and 37 to the position where it is supported by the abutment portions 31 and 37.

With this arrangement, by simply dropping the MIC 30 from a position where the MIC 30 is held substantially horizontally above the abutment portions 31 and 37 with the lower casing half 3 held substantially horizontally, the MIC 30 can be positioned at 45° to the bottom surface 3B of the cartridge casing 7. Further in the assembled state, the upper surface abutment portion 36 presses the MIC 30 from above to surely hold the MIC 30 in a position where the upper surface 30A is held at 45° to the bottom surface 3B of the cartridge casing 7.

The lower surface abutment portion 37 may comprise a single block which is provided with an inclined surface which abuts against the lower surface 30F of the MIC 30 over the entire area thereof. Further the arcuate surface 50a of the guide plate 50 may have a width substantially equal to the major length of the MIC 30 so that the entire length of the lower end face 30C of the MIC 30 is guided by the arcuate surface 50a.

In the memory holding structures of the first to third and fifth examples, the surfaces in contact with the MIC 30 may be provided with a cushioning material.

Further there is a possibility that some play is formed between the memory holding structure and the MIC 30 in the first to fifth examples. Accordingly the MIC 30 may be bonded to the memory holding structure by adhesive.

Figure 18:
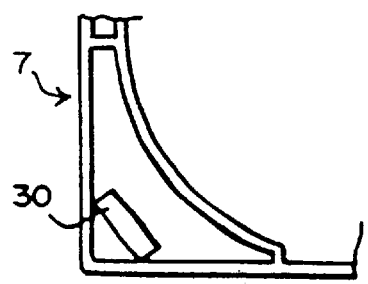
FIG. 18 is a fragmentary plan view showing a modification of the magnetic tape cartridge of the embodiment shown in FIG. 1.

Though being held so that the upper and lower end faces 30B and 30C are held in parallel to the side walls 2A and 3A in the first to fifth examples, the MIC 30 may be held so that the upper and lower end faces 30B and 30C are held at 45° to the side walls 2A and 3A as shown in FIG. 18. Further the MIC 30 may be held in any place so long as it does not interfere with rotation of the reel 4.

Sixth to eighth examples of memory holding structures which holds the MIC at 45° to the bottom surface 3B of the cartridge casing 7 in a way quite different from those of the first to fifth examples will be described hereinbelow.

Figure 19:
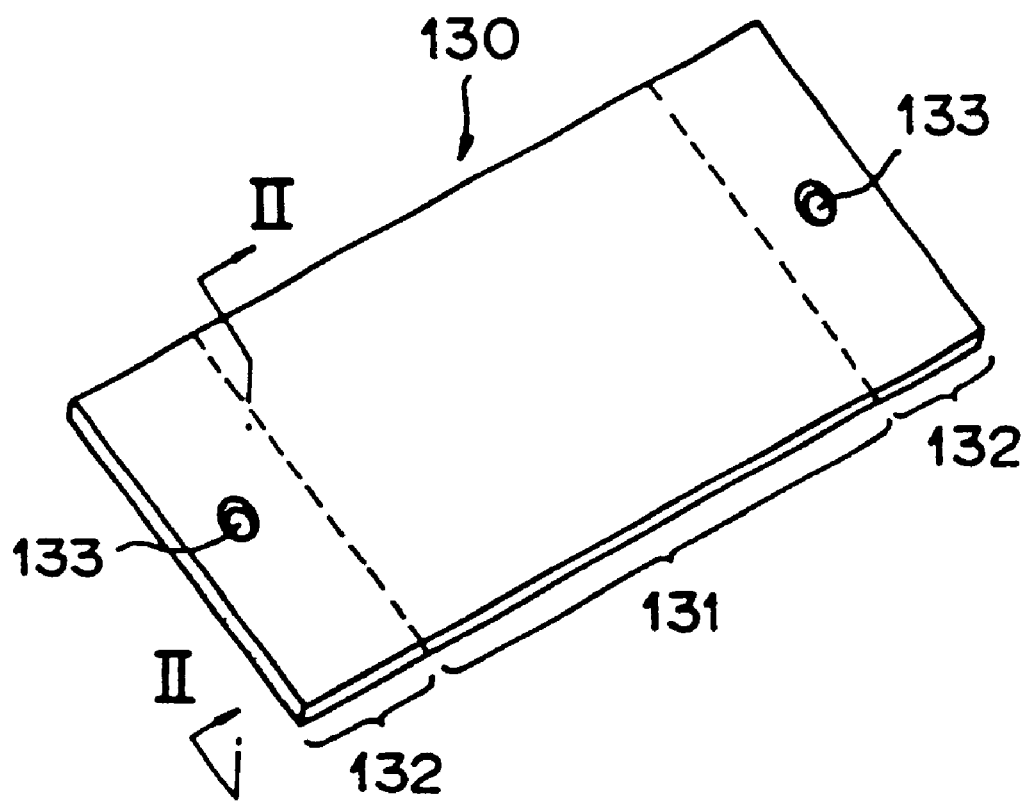
FIG. 19 is a view showing a memory element which is employed together with memory holder means of sixth to eighth examples.

FIG. 19 shows a MIC 130 which is employed together with the memory holding structures of the sixth to eighth examples. As shown in FIG. 19, the recording surface (upper surface) of the MIC 130 has a recording area 131 at the middle thereof and a pair of non-recording areas 132 on opposite sides of the recording area 131. The recording area 131 is an area actually used for recording information. Each non-recording area 132 is provided with a through hole 133. A post-like projection is press-fitted in the through hole, thereby holding the MIC 130 with its upper surface held at 45° to the bottom surface of the lower casing half 3. The through 133 may be of various shapes and the shape of the post-like projection is selected according to the shape of the through hole 133.

Figure 20A:
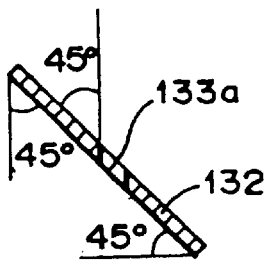
FIG. 20A is a cross-sectional view taken along line II—II in FIG. 19 for illustrating the through hole in the memory element employed in the memory holder means of the sixth example.
Figure 20B:
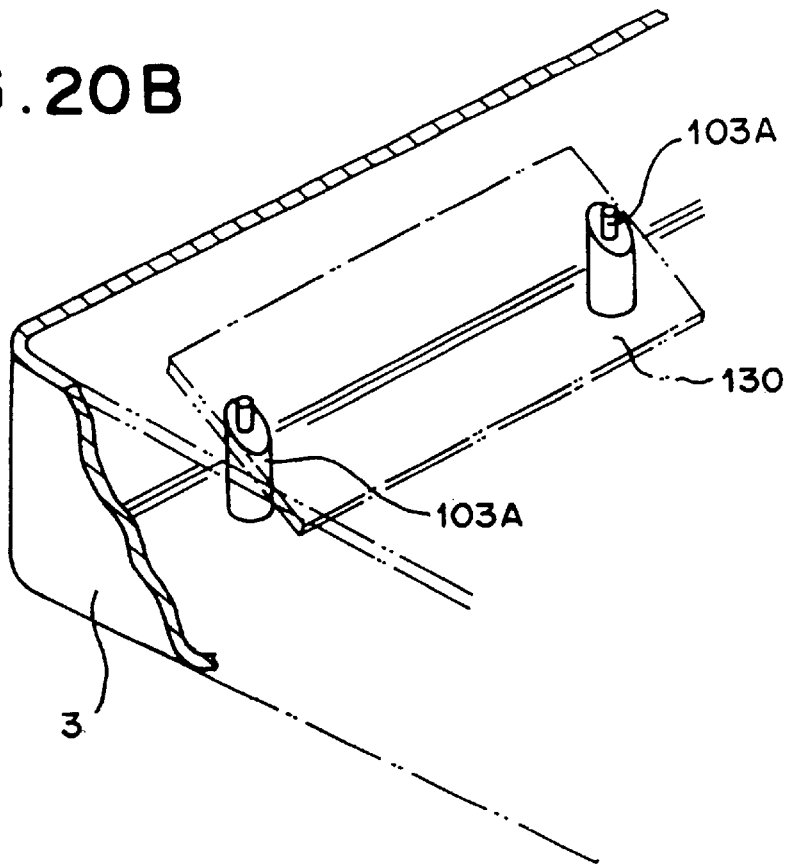
FIG. 20B is a fragmentary perspective view showing the post-like projections employed in the memory holder means of the sixth example.
Figure 20C:
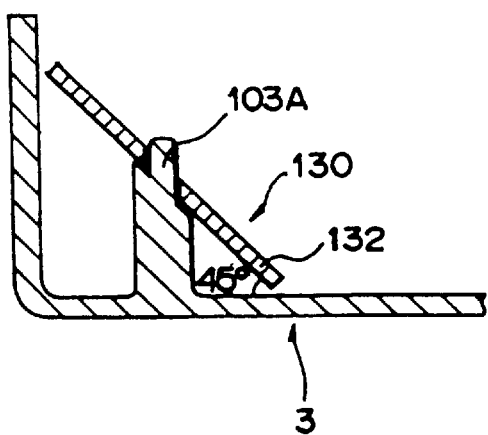
FIG. 20C is a fragmentary cross-sectional view showing the memory element and the post-like projection in engagement with each other in the sixth example.

In the sixth example of the memory holding structure shown in FIGS. 20A to 20C, the MIC 130 is provided with a pair of through holes 133a each of which is a straight hole whose inner peripheral surface is inclined at 45° to the upper and lower surfaces of the MIC 130 over the entire circumference. A pair of cylindrical post-like projections 103A are erected from the bottom of the lower casing half 3 as shown in FIGS. 20B and 20C. Each post-like projection 103A has a tip portion having a smaller diameter and a support shoulder inclined at 45° to the bottom surface of the lower casing half 3 is formed at the base of the tip portion. The tip portion of the post-like projection 103A is press-fitted in the through hole 133a so that the lower surface of the MIC 130 rests on the inclined support shoulder as clearly shown in FIG. 20C, whereby the MIC 130 is held with its upper surface inclined at 45° to the bottom surface of the lower casing half 3. The inclined support shoulder may be omitted. In this case, the MIC 130 is positioned by bringing the upper and lower ends of the MIC 130 into abutment respectively against the side wall and the bottom wall of the lower casing half 3.

Figure 21A:
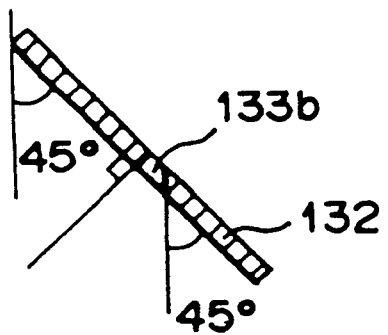
FIG. 21A is a cross-sectional view taken along line II—II in FIG. 19 for illustrating the through hole in the memory element employed in the memory holder means of the seventh example.
Figure 21B:
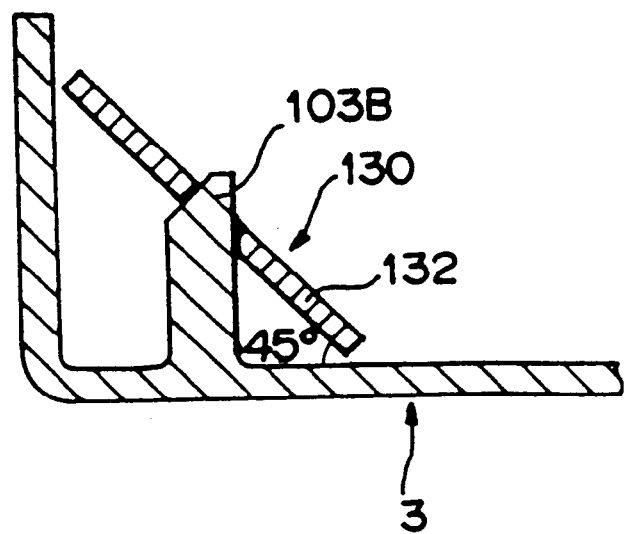
FIG. 21B is a fragmentary cross-sectional view showing the memory element and the post-like projection in engagement with each other in the seventh example.

In the seventh example of the memory holding structure shown in FIGS. 21A and 21B, the MIC 130 is provided with a pair of through holes 133b. Each through hole 133b has an inner peripheral surface which is partly vertical to the surfaces of the MIC 130 and partly inclined at 45° to the surfaces of the MIC 130. A pair of post-like projections 103B are erected from the bottom of the lower casing half 3 as shown in FIG. 21B. The outer peripheral surface of each post-like projection 103B is vertical to the bottom surface of the cartridge casing 7 and a surface inclined at 45° to the bottom surface of the cartridge casing 7 is formed near the top of the post-like projection 103B. The tip portion of the post-like projection 103B is press-fitted in the through hole 133b so that the part of the inner peripheral surface of the through hole 133b rests on the inclined surface of the post-like projection 103B as shown in FIG. 21B, whereby the MIC 130 is held with its upper surface inclined at 45° to the bottom surface of the cartridge casing 7.

Figure 22A:
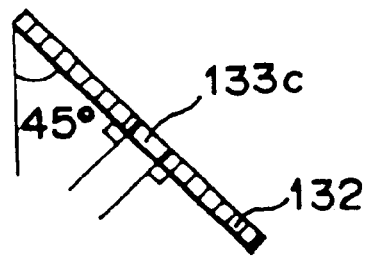
FIG. 22A is a cross-sectional view taken along line II—II in FIG. 19 for illustrating the through hole in the memory element employed in the memory holder means of the eighth example.
Figure 22B:
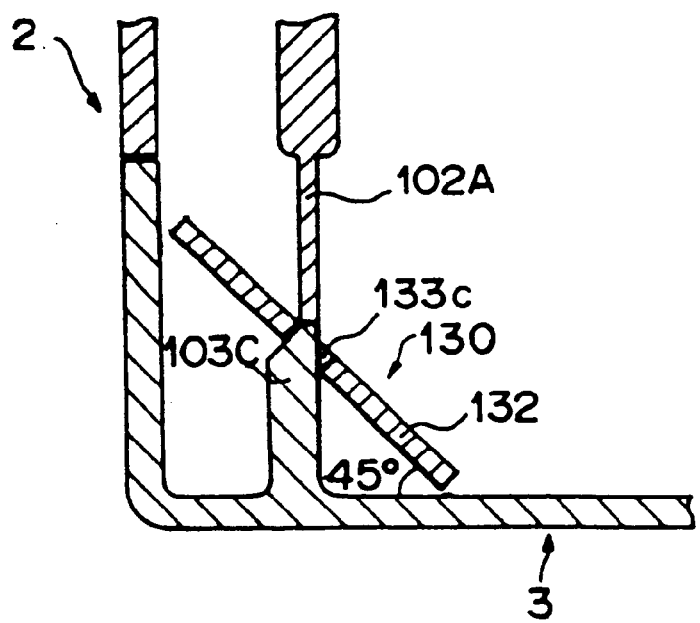
FIG. 22B is a fragmentary cross-sectional view showing the memory element and the post-like projection in engagement with each other in the eighth example.

In the eighth example of the memory holding structure shown in FIGS. 22A and 22B, the MIC 130 is provided with a pair of through holes 133c whose inner peripheral surface is vertical to the upper and lower surfaces of the MIC 130 over the entire circumference. In this case, a pair of post-like projections 103C which are similar to those 103B employed in the seventh example can be employed. By press-fitting the post-like projections 103C into the through holes 133c, the MIC 130 is held with its upper surface inclined at 45° to the bottom surface of the cartridge casing 7 as shown in FIG. 22B.

In the eighth example, since there is fear that the MIC 130 cannot be stabilized by simply press-fitting the post-like projections 103C into the through holes 133c, it is preferred that a pair of retainer ribs 102A are provided on the upper casing half 2 so that the lower ends of the retainer ribs 102A abut against the top surfaces of the post-like projections 103C as shown in FIG. 22B.

Figure 23A:
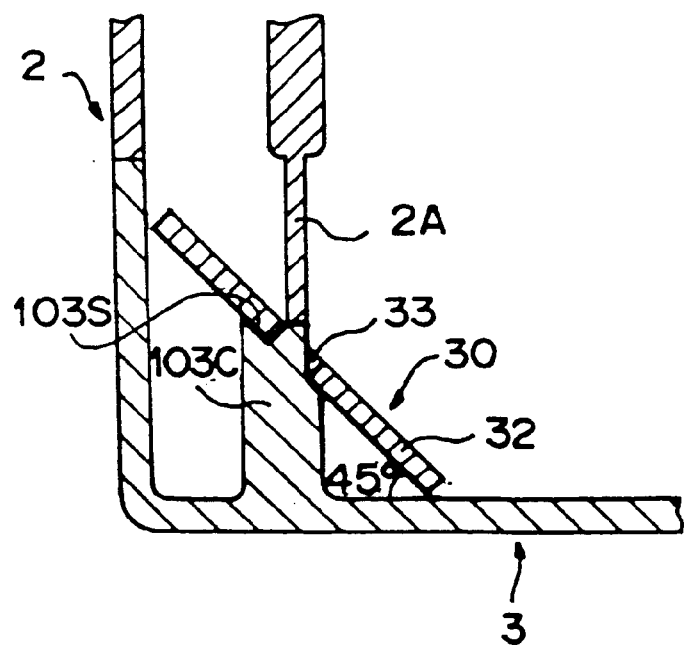
FIGS. 23A and 23B are fragmentary cross-sectional views respectively showing modifications of the eighth example.
Figure 23B:
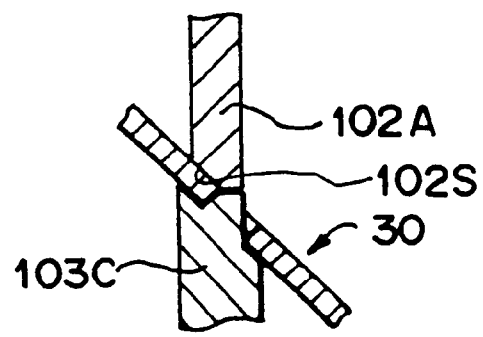

The post-like projection 103C may be provided with a support shoulder 103S which is inclined at 45° to the bottom surface of the cartridge casing 7 and supports the lower surface of the MIC 130 from below as shown in FIG. 23A. Further the retainer rib 102A may be provided with an abutment surface 102S which is inclined at 45° to the bottom surface of the cartridge casing 7 and abuts against the upper surface of the MIC 130 as shown in FIG. 23B.

In the sixth to eighth examples, the eighth example in which the through holes 133c are vertical to the surfaces of the MIC 130 is most advantageous from the viewpoint of facility of manufacturing the MIC 130. For example the through holes 133c can be formed simultaneously with molding of the body of the MIC 130. However when the through holes are inclined as in the sixth and seventh examples, it is generally required to form the through holes after molding of the body of the MIC 130 since it is difficult to form the inclined through holes simultaneously with molding of the body of the MIC 130 depending on the direction of ejection of the product from the mold. However the latter two examples are advantageous over the former in that the MIC 130 can be held more stably.

Figure 24:
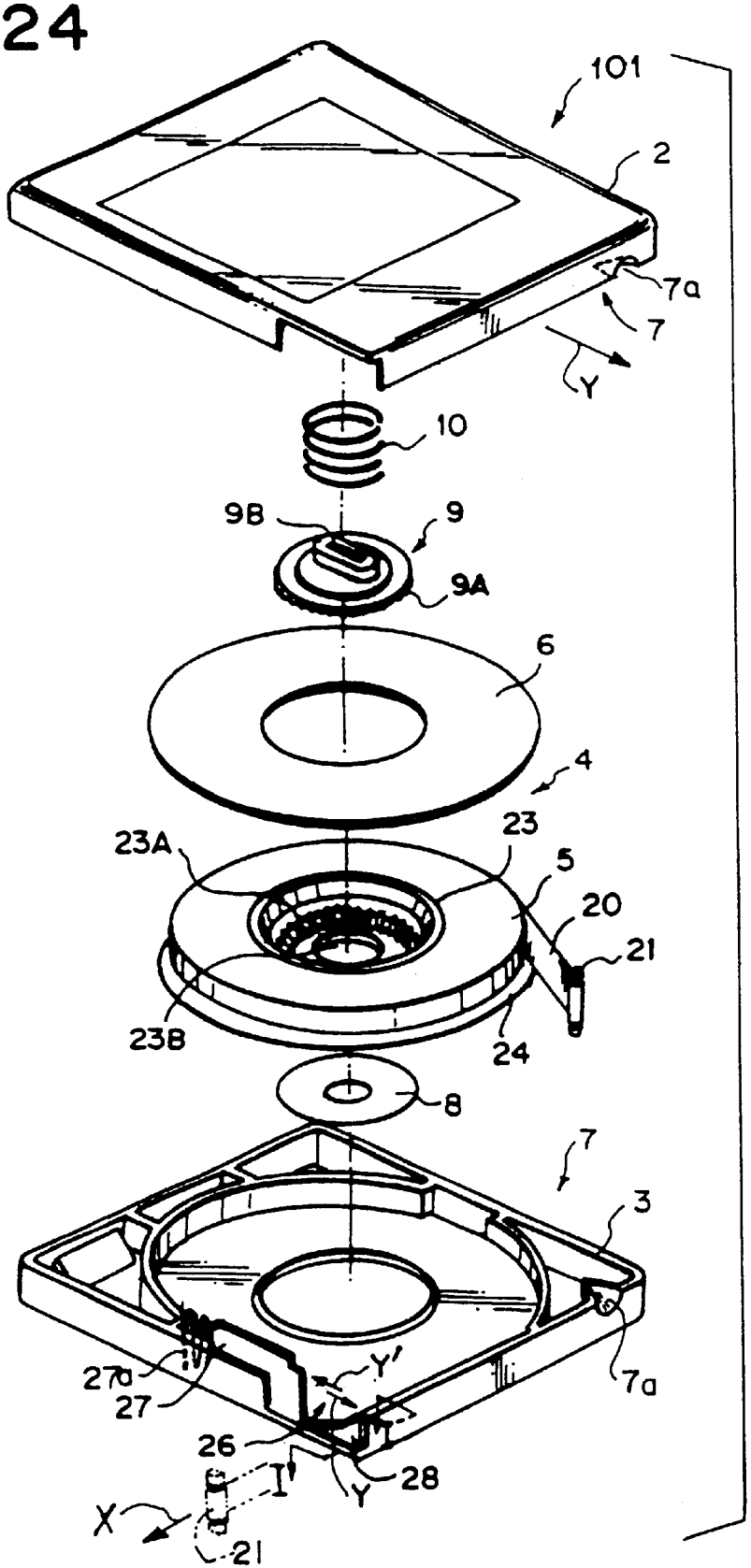
FIG. 24 is an exploded perspective view of a magnetic tape cartridge in accordance with another embodiment of the present invention.

A magnetic tape cartridge in accordance with another embodiment of the present invention will be described hereinbelow. FIG. 24 shows the magnetic tape cartridge 101 of this embodiment. The magnetic tape cartridge 101 of this embodiment is substantially the same in structure as the magnetic tape cartridge 1 shown in FIG. 1 except that an engagement recess 7a is formed on the front face of the cartridge casing 7. Accordingly the elements analogous to those shown in FIG. 1 are given the same reference numerals and will not be described here. In FIG. 24, reference numeral 27a denotes a spring for urging the slide door 27 toward the closing position. Arrow Y indicates the direction of insertion of the magnetic tape cartridge 101 into a recording and reproducing system which is equal to the direction in which the slide door 26 is slid to close the tape outlet opening 26. When opening the tape outlet opening 26, the slide door is slid in the direction of arrow Y'.

The engagement recess 7a is formed partly in the upper casing half 2 and partly in the lower casing half 3, and when the upper and lower casing halves 2 and 3 are mated together, a conical engagement recess 7a is formed. When the magnetic tape cartridge 101 is loaded in the recording and reproducing system, a stopper 110 in the form of a conical projection in the recording and reproducing system is brought into engagement with the engagement recess 7a as shown in FIG. 25B.

When the magnetic tape cartridge 101 is loaded in the recording reproducing system, the gears 23A and 9A of the hub 23 and the brake button 9 are disengaged from each other to permit rotation of the reel 4 in the manner described above and the drive mechanism of the recording and reproducing system holds the reel plate 8 under magnetic force and rotates the reel 4. At the same time, the slide door 27 is opened overcoming the force of the spring 27a and the leader pin 21 is brought to a predetermined position in a tape running path, thereby recording or reproduction becomes feasible.

Figure 26:
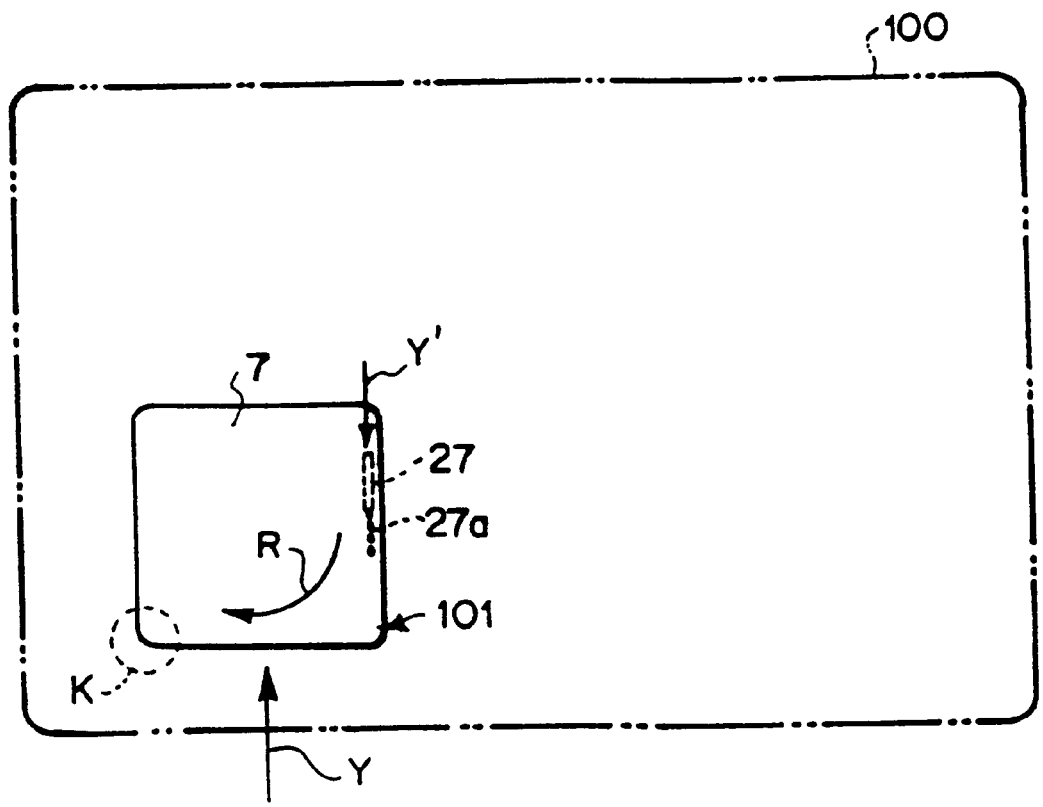
FIG. 26 is a schematic view for illustrating turning moment which acts on the magnetic tape cartridge.

In FIG. 26, when the magnetic tape cartridge 101 is loaded in the recording and reproducing system 100 and the slide door 27 is opened overcoming the force of the spring 27a, counterforce of the urging force of the spring 27a acts on the cartridge casing 7 in the direction of arrow Y'. Since the center of the magnetic tape cartridge 1 is fixed by the brake release spindle, turning moment R generated by the counterforce acts on the cartridge casing 7 about the center of the reel 4. The space in the recording and reproducing system 100 in which the magnetic tape cartridge 101 is loaded is slightly larger than the outer dimensions of the magnetic tape cartridge 101 in order to accommodate fluctuation in size of the magnetic tape cartridge 101 and facilitate load of the magnetic tape cartridge 101. Accordingly, the wall surface defining the space in the recording and reproducing system is at a space from the outer surface of the magnetic tape cartridge 101 and the space permits the magnetic tape cartridge 101 to be rotated under the turning moment R. When the magnetic tape cartridge 101 is rotated in the recording and reproducing system 100, the ejection mechanism of the recording and reproducing system cannot properly grip the magnetic tape cartridge 101 and a corner portion K of the magnetic tape cartridge 101 can abut against the inner wall of the space when the magnetic tape cartridge 101 is ejected from the recording and reproducing system, which can obstruct ejection of the magnetic tape cartridge 101.

However in the case of this embodiment, engagement of the engagement recess 7a with the stopper 110 generates load in the direction of arrow y' (FIG. 25B), which generates turning moment R' (FIG. 25A) which cancels the turning moment R and prevents rotation of the magnetic tape cartridge 101.

Figure 25A:
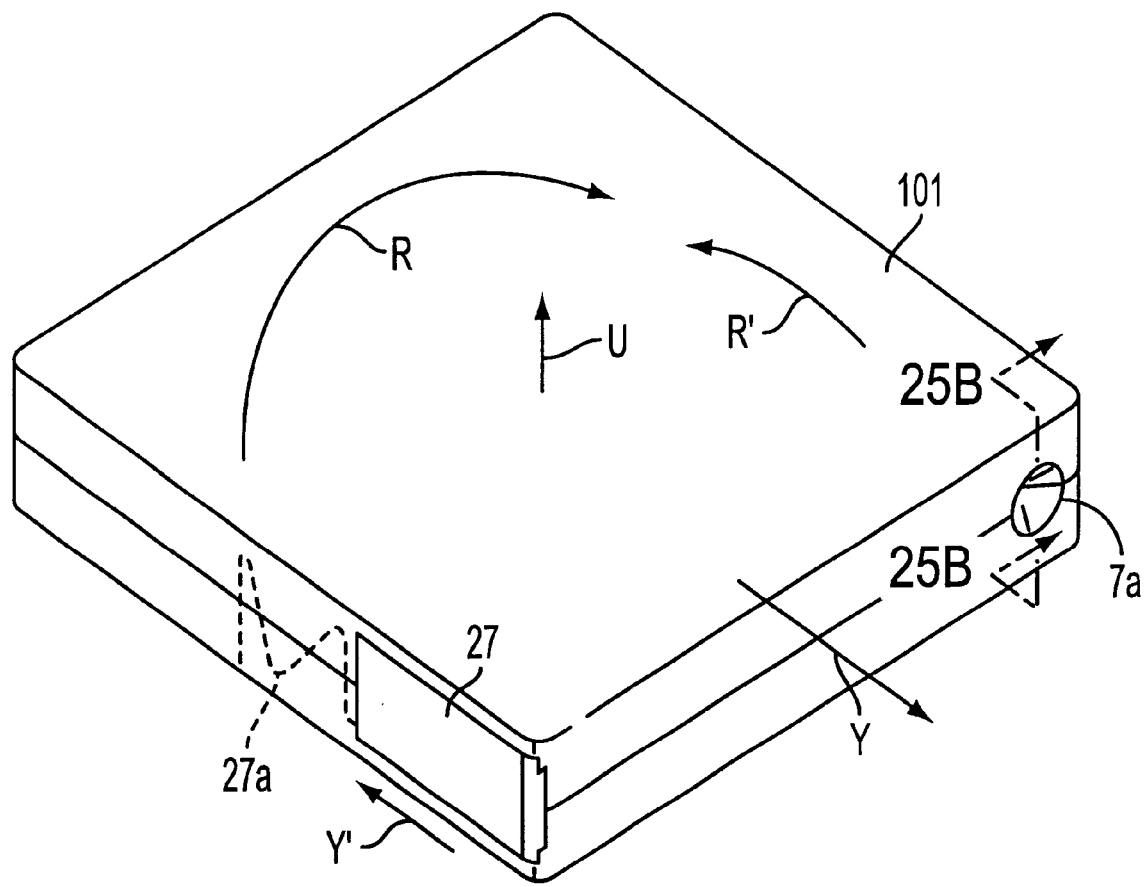
FIG. 25A is a perspective of the magnetic tape cartridge in the assembled state.
Figure 25B:
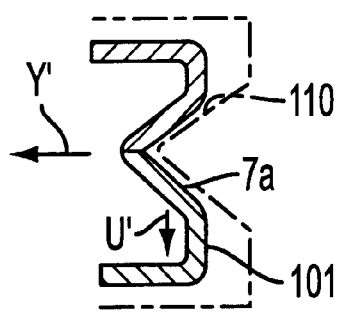
FIG. 25B is a fragmentary cross-sectional view taken along line B—B in FIG. 25A.

Further when the brake release spindle pushes upward the brake button 9, counterforce against the urging force of the coiled spring 10 acts on the magnetic tape cartridge 101 in the direction of arrow U (FIG. 25A). However engagement of the engagement recess 7a with the stopper 110 generates load in the direction of arrow U' (FIG. 25B), which cancels the counterforce in the direction of arrow U and prevents the magnetic tape cartridge 101 from being moved in the direction of arrow U.

Figure 27A:
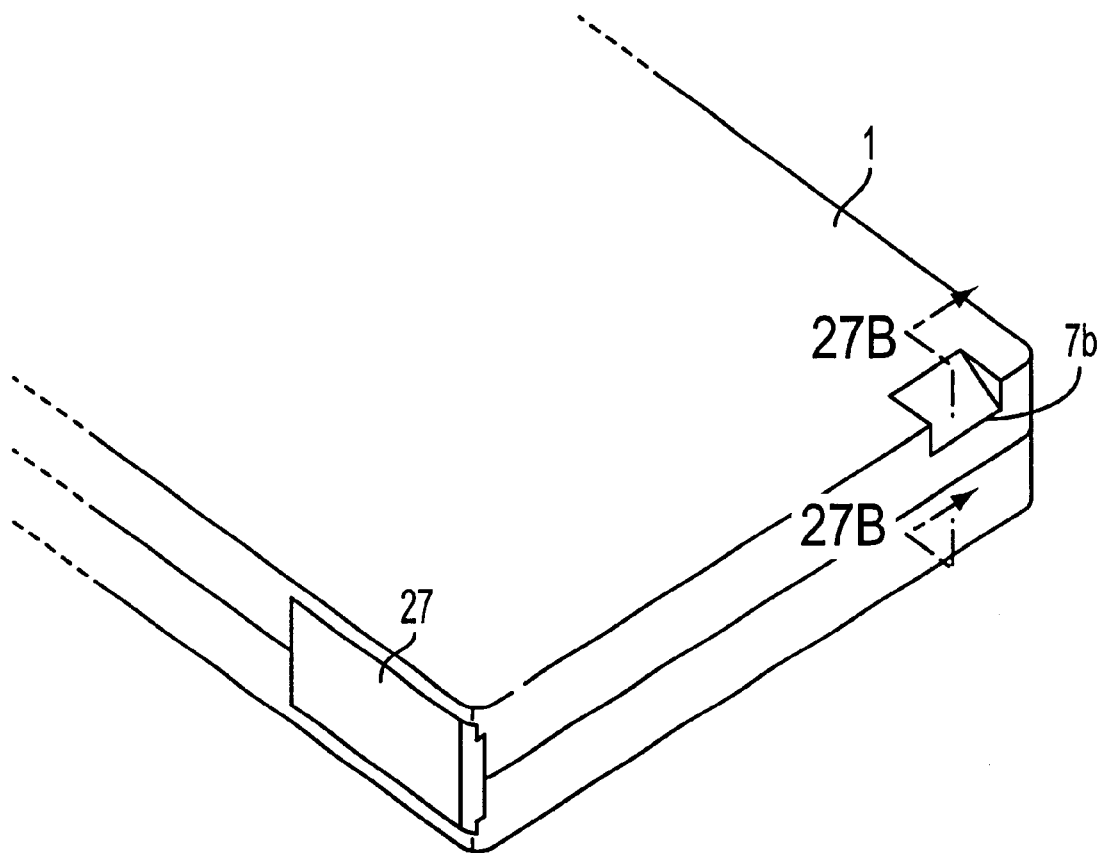
FIG. 27A is a fragmentary perspective view showing a modification of the magnetic tape cartridge of the embodiment.
Figure 27B:
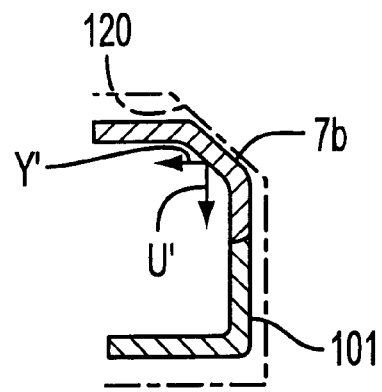
FIG. 27B is a fragmentary cross-sectional view taken along line C—C in FIG. 27A.
Figure 28A:
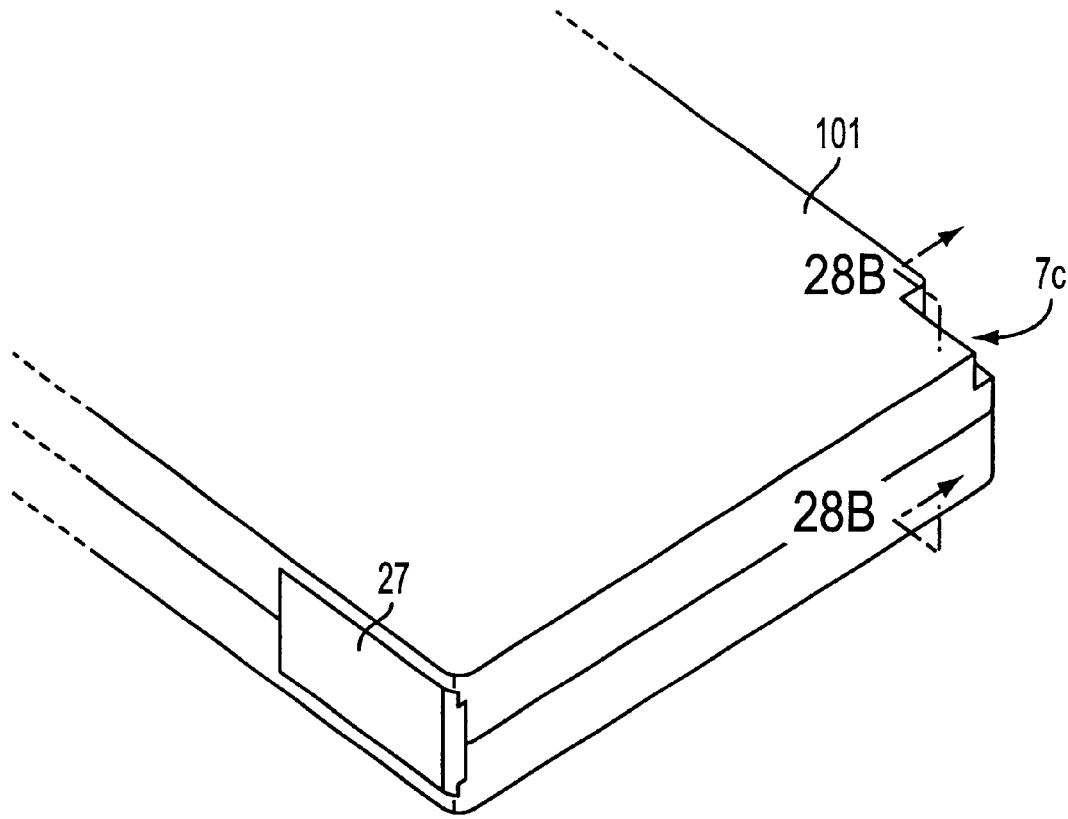
FIG. 28A is a fragmentary perspective view showing another modification of the magnetic tape cartridge of the embodiment.
Figure 28B:
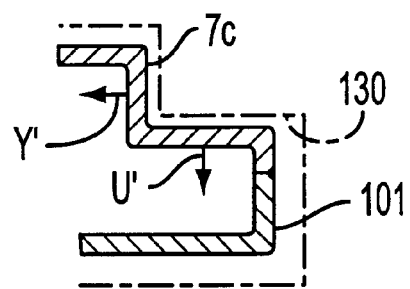
FIG. 28B is a fragmentary cross-sectional view taken along line D—D in FIG. 28A.

Though, in the second embodiment, the magnetic tape cartridge 101 is provided with a conical engagement recess 7a, the magnetic tape cartridge 101 may be provided with an engagement recess of various shapes according to the shape of the stopper of the recording and reproducing system. For example, the magnetic tape cartridge 101 may be provided with an engagement recess 7b or 7c shown in FIGS. 27A and 28A depending on the shape of the stopper 120 and 130 shown in FIGS. 27B and 28B.

What is claimed is:

1. A magnetic tape cartridge comprising a cartridge casing formed by upper and lower casing halves mated together and a single reel around which a magnetic tape is wound and which is supported for rotation in the cartridge casing by the upper casing half, comprising:

a non-contact type memory element having a recording surface; and a memory holder means for holding said non-contact type memory element such that the recording surface is held substantially at 45° to a bottom surface of the cartridge casing.

2. A magnetic tape cartridge as defined in claim 1 wherein the memory holder means comprises a lower end face abutment portion which abuts against a lower end face of the memory element and an upper end face abutment portion which abuts against an upper end face of the memory element.

3. A magnetic tape cartridge as defined in claim 2 in which the lower end face abutment portion comprises a recess which is formed on the bottom surface of the lower casing half to extend in parallel to a side wall of the lower casing half in a length substantially equal to the length of the major side of the memory element and a protrusion which projects inward from the recess, the recess being a right triangle in cross-section and being provided with end faces and inclined side surfaces, one of the side surfaces smoothly merging with a surface of the protrusion to form a flat surface which is at substantially 45° to the bottom surface of the lower casing half and supports the lower end face of the memory element, the end faces of the recess holding the side faces of the memory element, and the upper end face abutment portion is formed on a lower end portion of a block which extends inward from a side wall of the upper casing half and comprises a recess which is a right triangle in cross-section and is formed in the lower surface of the block, the recess comprising opposed inclined surfaces which are in contact respectively with the upper end face of the memory element and the upper surface of the memory element near the upper end face.

4. A magnetic tape cartridge as defined in claim 2 in which the lower end face abutment portion comprises a recess which is formed on the bottom surface of the lower casing half to extend in parallel to a side wall of the lower casing half in a length substantially equal to the length of the major side of the memory element, the recess being a right triangle in cross-section and being provided with end faces and inclined side surfaces, one of the side surfaces being inclined at substantially 45° to the bottom surface of the lower casing half and supports the lower end face of the memory element, and the end faces of the recess holding the side faces of the memory element.

5. A magnetic tape cartridge as defined in claim 2 in which the upper end face abutment portion doubles as a rib for reinforcing the upper casing half.

6. A magnetic tape cartridge as defined in claim 2 in which the lower end face abutment portion comprises a pair of L-shaped members each of which is engaged with a part of a side face and a part of the lower end face of the memory element and the upper end face abutment portion is in the form of a recess which is formed in the lower casing half at a portion where the lower casing half is butted against the upper casing half and extends along a side wall of the cartridge casing in a length slightly longer than the length of the memory element.

7. A magnetic tape cartridge as defined in claim 2 in which the upper end face abutment portion is in the form of a recess which is formed partly in the lower casing half and partly in the upper casing half at a portion where the lower casing half is butted against the upper casing half and extends along a side wall of the cartridge casing in a length slightly longer than the length of the memory element.

8. A magnetic tape cartridge as defined in claim 1 in which the memory holder means comprises a lower end face abutment portion which abuts against the lower end face of the memory element, an upper end face abutment portion which abuts against the upper end face of the memory element and an upper surface abutment portion which abuts against the upper surface of the memory element.

9. A magnetic tape cartridge as defined in claim 1 in which the memory holder means comprises a lower side face abutment portion which snugly receives a part of the side faces of the memory element from below and an upper side face abutment portion which snugly receives a part of the side faces of the memory element from above.

10. A magnetic tape cartridge as defined in claim 9 in which the lower side face abutment portion is formed in a corner between a side wall and the bottom surface of the lower casing half and comprises a pair of support members respectively having support surfaces which are inclined at 45° to the bottom surface of the lower casing half and are respectively provided with recesses which snugly receive the side faces of the memory element from below, and the upper side face abutment portion is formed in a corner between a side wall and the top surface of the upper casing half and comprises a pair of support members respectively having support surfaces which are inclined at 45° to the top surface of the upper casing half and are respectively provided with recesses which snugly receive the side faces of the memory element from above.

11. A magnetic tape cartridge as defined in claim 9 in which the lower side face abutment portion is formed in a corner between a side wall and the bottom surface of the lower casing half and comprises a pair of support members respectively having support surfaces which are inclined at 45° to the bottom surface of the lower casing half and are respectively provided with recesses which are substantially the same in depth as the thickness of the memory element and snugly receive the side faces of the memory element from below, and the upper side face abutment portion is formed in a corner between a side wall and the top surface of the upper casing half and comprises a pair of support members respectively having support surfaces which are inclined at 45° to the top surface of the upper casing half and are in contact with upper surface the memory element.

12. A magnetic tape cartridge as defined in claim 1 in which the memory holder means is formed of a cushioning material and holds the memory element away from the inner surface of the cartridge casing.

13. A magnetic tape cartridge as defined in claim 12 in which the lower end face abutment portion is in the form a block which is of cushioning material and extends inward from the bottom surface of the lower casing half, the block being provided with a recess which extends in parallel to a side wall of the lower casing half in a length substantially equal to the length of the major side of the memory element and receives the lower end face of the memory element and a portion of the lower surface near the lower end face, whereby the lower end face abutment portion holds the memory element away from the bottom of the cartridge casing, and the upper end face abutment portion is formed on first and second blocks which are of cushioning material and extend inward respectively from a side wall of the upper casing half and a side wall of the lower casing half, the first block being provided with a recess which receives the upper end face of the memory element and a portion of the upper surface of the memory element near the upper end face, and the second block being provided with an inclined surface which abuts against the lower surface of the memory element at a portion near the upper end face thereof, whereby the upper end face abutment portion holds the memory element away from the side walls of the cartridge casing.

14. A magnetic tape cartridge as defined in claim 12 in which the memory holder means further comprises a block which abuts against the entire area of the lower surface of the memory element.

15. A magnetic tape cartridge as defined in claim 12 in which the upper and lower end face abutment portions are integrated into a holding member.

16. A magnetic tape cartridge as defined in any one of claims 1 to 15 in which the memory element is bonded to the memory holder means by adhesive.

17. A magnetic tape cartridge as defined in claim 1 in which the lower casing half is provided with a guide member which guides the memory element dropped toward the memory holder means to the position where the memory element is held by the memory holder means.

18. A magnetic tape cartridge as defined in claim 1 in which the memory holder means comprises a through hole formed in a non-recording area of the memory element and a post-like projection which is formed in the cartridge casing and is fitted in the through hole to hold the memory element with its recording surface inclined at 45° to the bottom surface of the cartridge casing.

19. A magnetic tape cartridge as defined in claim 18 in which a retainer rib is provided on the upper casing half so that the lower end of the retainer rib abuts against the top surface of the post-like projection.

20. A magnetic tape cartridge as defined in claim 1 wherein the memory holder means includes casing portions which hold the non-contact type memory element substantially at 45° to both the bottom surface and a side surface of the cartridge casing.

21. A magnetic tape cartridge, comprising:

a non-contact type memory element; and a cartridge casing which defines a side and a bottom, wherein the cartridge casing is configured to hold the non-contact type memory element substantially at a 45° degree angle to both the side and the bottom defined by the cartridge casing.

22. A magnetic tape cartridge as defined in claim 21 wherein the non-contact type memory element includes a first side which contacts the side defined by the cartridge casing and a second side which contacts the bottom defined by the cartridge casing.

23. A magnetic tape cartridge as defined by claim 22 wherein the first and second sides of the non-contact memory type element are substantially parallel to each other.

24. A magnetic tape cartridge, comprising:

a non-contact type memory element; and a cartridge casing that defines a side and a bottom, wherein the non-contact type memory element is disposed within the cartridge casing substantially at a 45° degree angle to both the side and the bottom defined by the cartridge casing, wherein the non-contact type memory element includes a first side that contacts the side defined by the cartridge casing and a second side which contacts the bottom defined by the cartridge casing, and further wherein the side and the bottom of the cartridge casing intersect at an intersection location, wherein the side defined by the cartridge casing includes a first abutment portion which is configured to abut against the first side of the memory element, wherein the bottom defined by the cartridge casing includes a second abutment portion which is configured to abut against the second side of the memory element, and wherein the first and second abutment portions are substantially equidistant from the intersection location.

25. A magnetic tape cartridge as defined by claim 24, wherein the first and second sides of the non-contact memory type element are substantially parallel to each other.

\* \* \* \* \*